United States Patent [19]
Lorbiecki et al.

[11] Patent Number: 5,176,356
[45] Date of Patent: Jan. 5, 1993

[54] SEAT SUSPENSION WITH QUICK HEIGHT ADJUSTMENT

[75] Inventors: James R. Lorbiecki, Milwaukee; Ronald T. Uecker, Slinger; Bruce B. Dahlbacka, Port Washington, all of Wis.

[73] Assignee: Milsco Manufacturing Company, Milwaukee, Wis.

[21] Appl. No.: 798,967

[22] Filed: Nov. 27, 1991

[51] Int. Cl.⁵ .............................................. F16M 13/00
[52] U.S. Cl. .................................. 248/577; 248/157; 248/162.1; 248/409; 248/610; 297/307; 297/345
[58] Field of Search ............... 248/157, 297.3, 576, 248/577, 581, 162.1, 407, 408, 409, 610; 297/345, 307, 308

[56] References Cited

U.S. PATENT DOCUMENTS

| | | | |
|---|---|---|---|
| 1,488,300 | 3/1924 | Thompson | 248/297.3 X |
| 1,826,643 | 10/1931 | Anderson | 248/297.3 X |
| 3,291,525 | 12/1966 | Fritzmeier | 297/308 |
| 3,326,603 | 6/1967 | Lehner | 297/308 |
| 3,572,828 | 3/1971 | Lehner | 297/308 |
| 3,705,745 | 12/1972 | Ambrosius | 297/308 |
| 3,861,637 | 1/1975 | DeLongchamp | |
| 3,954,298 | 5/1976 | Lowe | 297/308 |
| 4,186,963 | 2/1980 | Koutsky | 297/345 X |
| 4,662,597 | 5/1987 | Uecker et al. | 297/307 X |
| 4,817,908 | 4/1989 | Hanlon et al. | 248/581 X |
| 4,838,514 | 6/1989 | Hill | 297/308 X |

Primary Examiner—David L. Talbott
Attorney, Agent, or Firm—Nilles & Nilles

[57] ABSTRACT

A seat suspension having a stationary support that can be mounted on a vehicle. An intermediate frame is mounted on the stationary support for vertical sliding movement relative thereto by a spring suspension. A seat support frame is mounted on the intermediate frame for upward or downward movement relative thereto. A ratchet assembly interconnects the seat support frame and the intermediate frame and includes ratchet members on one of the frames and a pawl member on the other of the frames. A pawl release, including a biasing spring and a pawl actuating member, is provided to allow the support frame to be moved from the lower to any intermediate upper position and create an impulse at each position without need to activate said activating member. The activating member is operative to selectively move the pawl to a nonengagement position.

19 Claims, 9 Drawing Sheets

SEAT SUSPENSION WITH QUICK HEIGHT ADJUSTMENT

BACKGROUND OF THE INVENTION

1. Field of the Invention

This invention relates to a seat suspension that will permit quick adjustment of the vertical height of the seat and more particularly will permit the seat to be adjusted from its lowest to an intermediate or highest position without the need for the operator to hold a latch mechanism controlling the seat height adjustment in a nonengaged position.

2. Description of the Prior Art

The prior art discloses many different types of suspension systems that mount a vehicle seat, such as a tractor seat or the like, to float within a vertical range of movement on a vehicle in a manner permitting the selection of any one of several vertical seat height positions within the range of floating movement. This selection enables the operator to set the vertical height of the seat relative to the vehicle to accommodate the operator's height.

Prior art seat suspension systems typically comprise a stationary support in the form of a vertical tower that is mounted on a track mechanism which allows the tower to be adjusted fore and aft relative to the vehicle steering wheel. An intermediate frame is mounted on the tower by an adjustable main spring suspension system for vertical floating movements relative to the tower. The suspension system may include a shock absorber for damping the floating movements. A seat support frame that carries an operator's seat is mounted on the intermediate frame and is normally biased to one position relative to the intermediate frame by a secondary spring connected between the intermediate frame and the seat support frame. Provision is made so that any one of several vertical positions of the seat support frame relative to the intermediate frame can be selected.

U.S. Pat. No. 3,861,637, issued Jan. 21, 1975 to Jacques Albert Huot DeLongchamp, discloses this general type of seat suspension system. In this prior art seat suspension, the seat support frame is releasably interlocked with the intermediate frame by means of a single withdrawable horizontal locking bolt that passes from the center of the seat support frame through one of a series alignable holes in the intermediate seat support frame.

The use of a horizontal lock bolt causes the operator significant difficulties when attempting to select a comfortable seat height within the range of floating movement. For example, when the seat is in its lowermost position relative to the intermediate frame and the operator desires to raise the sea height relative to the intermediate frame, the operator must withdraw the lock bolt and to do so, the operator must remove his weight from the seat. This weight removal results in the main spring of the suspension causing the now unloaded seat to move upward to the top end of its vertical range of travel and also results in the secondary spring automatically raising the seat support frame upward relative to the intermediate frame. Thus, when the operator removes his weight and releases the lock bolt, the seat will move to its maximum vertical height and the operator now has no convenient reference point to indicate how much the seat support frame should be lowered relative to the intermediate frame. DeLongchamp shows four seat height position holes and with the seat at its uppermost position, the operator must guess in which hole the locking bolt should be placed to provide a proper height setting. As a practical matter, the operator sits down and applies downward pressure on the seat, guesses when to release the locking bolt and then when it enters a hole, applies his full weight to the seat to cause it to move down to its working range where the operator can determine if the height setting is correct.

Thus, the setting of the seat height is a repetitive hassle and requires the operator to engage in a time-consuming, annoying, and repetitive select-and-try type of procedure. This is true even when the operator knows exactly in which intermediate hole the bolt must be placed to achieve the correct height setting because there is no way for the operator to actually know when he has the lock bolt inserted into the desired hole other than actually permitting the lock bolt to insert itself in a hole and then applying full weight to the seat to test the actual seat height.

Another disadvantage is that the lock bolt cannot be locked into a selected position. This means that the lock bolt can be withdrawn when the seat is unoccupied. If this occurs, the stored force of the secondary spring will raise the seat support frame relative to the intermediate frame to an upper limit position, and when the operator reoccupies the seat he must again go through the repetitive select-and-try seat height selection procedure.

A further disadvantage of known seat suspensions concerns lateral stability of the lower rear portions of the operator's seat. In the prior art, this lower rear portion of the seat is stabilized by the single centrally located locking bolt. During operation, especially on uneven terrain, the tractor will tilt in lateral directions and cause the operator's weight to repetitively shift from side to side. In such conditions, the single center locking bolt tends to act as a central pivot allowing the lower portion of the seat to twist.

Present seat suspensions do not solve these problems. Specifically, known seat suspensions do not provide a simple rugged seat suspension wherein the operator can quickly and easily adjust the seat height to a desired vertical position without the need to activate a release mechanism and which provides lateral stability for the lower rear portion of the operator's seat.

SUMMARY OF THE INVENTION

In accord with the invention, there is provided a seat suspension for a vehicle seat that will permit the quick height adjustment thereof without the need to withdraw a lock bolt and which will provide a tactile or audible impulse or both which can be noted by the operator to tell him or her exactly what vertical position the seat is in.

In a first embodiment, the seat suspension comprises a stationary support means adapted to be mounted on the vehicle; an intermediate frame means; and a suspension means that mounts the intermediate frame means on the stationary support means for vertical sliding movement relative thereto. A seat support frame means is mounted on the intermediate frame for movement relative thereto between vertically spaced lower, intermediate and upper positions. Ratchet means including a plurality of vertically spaced ratchet members are mounted on one of the frame means and a pawl member is mounted on the other of the frame means for movement from an engagement position relative to the ratchet members wherein it releasably secures the seat support frame in any one of the selected lower, intermediate or upper positions to a nonengagement position wherein it permits the seat support frame to be freely moved to any other lower, intermediate or upper position. A pawl release means is provided including a biasing member and an actuating means. The biasing member releasably urges the pawl member into the engagement position while permitting the seat support frame to be freely slid upward to cam the pawl member into the nonengagement position and allow said support frame to move from a lower to any of the intermediate or upper positions and create a tactile or audible impulse or both at each position without activating the pawl release means. The actuating means is mounted for selectively moving the pawl member to the nonengagement position wherein the seat support frame is permitted to be freely moved to any upper, intermediate or lower position.

In a second embodiment of the invention, the pawl member is provided with a lockout latch means that permits the operator to either lock the pawl member in the engagement position preventing any change in the height that has been selected, or release the pawl member to allow quick adjustment of the seat height. In the second embodiment, the pawl member further includes a cam follower means movable to pawl locked and pawl unlocked positions. The pawl release actuating means comprises an actuating member and a releasable lockout latch means. The lockout latch means has a pawl lock cam surface and a pawl unlocked cam surface. The pawl locked cam surface is contacted by the cam follower means to lock the pawl in its engagement position, and said pawl unlocked cam surface is contacted by the cam follower means to place said pawl in the unlocked nonengagement position. The biasing member is connected to said lockout latch means to releasably bias the lockout latch means toward said pawl engaged position.

When the cam follower means is in contact with the pawl lock cam surface, the seat suspension is locked in its then selected position. If the cam follower means is in contact with the pawl unlocked cam surface, the seat suspension can be adjusted. For example, the seat support frame can be placed in its lower position and raised to create either the tactile or audible impulse or both to indicate to the operator the exact height adjustment position the seat support frame is then at.

BRIEF DESCRIPTION OF THE DRAWINGS

Referring to the drawings.

DESCRIPTION OF THE PREFERRED EMBODIMENTS FIRST EMBODIMENT

Figure 3:
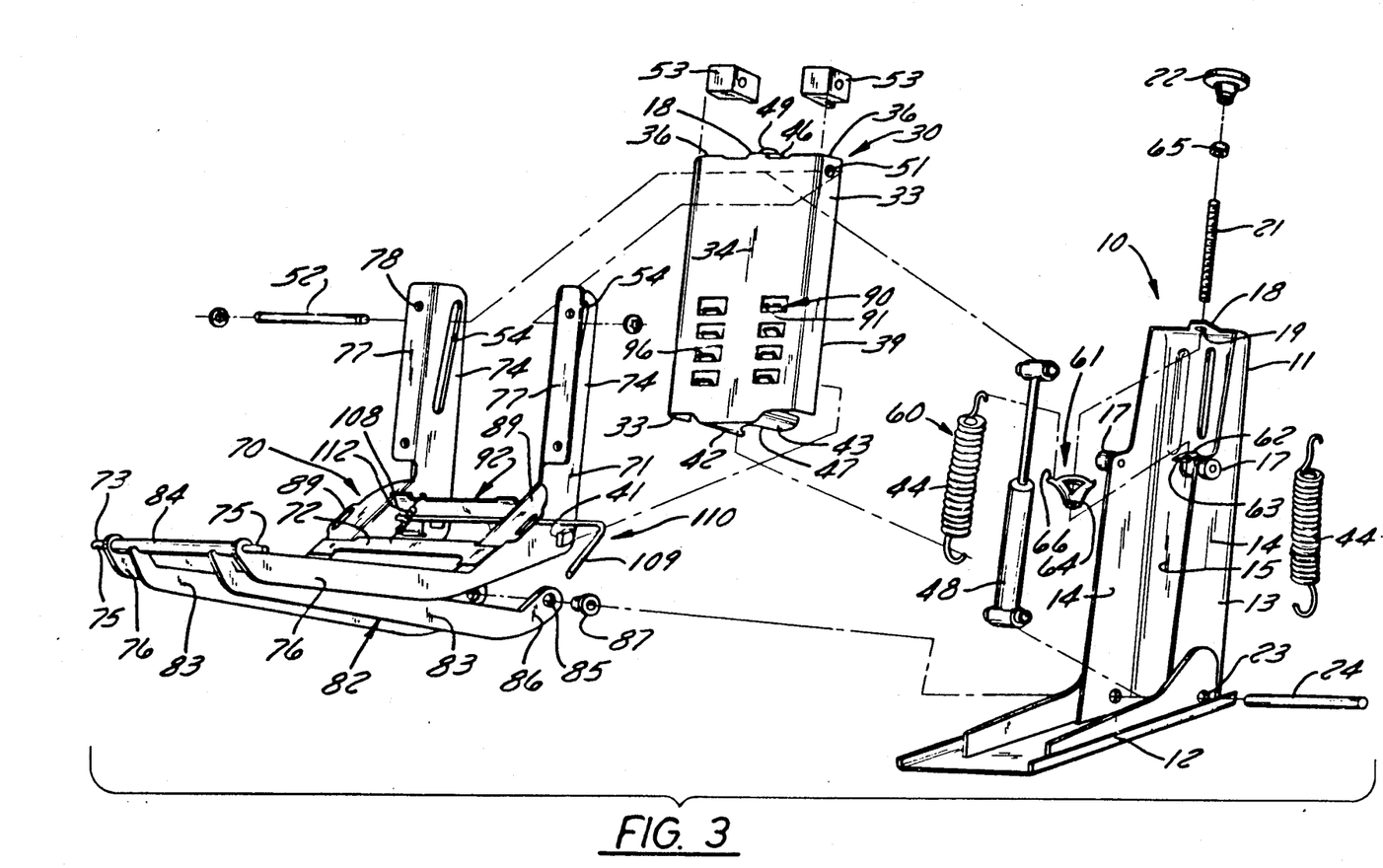
FIG. 3 is an exploded isometric projection view of the seat suspension shown in FIG. 1.

Referring to FIG. 3, the seat suspension broadly comprises a stationary support means 10 in the form of a tower assembly 11 adapted to be mounted on a vehicle such as a tractor, not shown; an intermediate frame means 30; a suspension means 60 for mounting the intermediate frame means 30 on the stationary support means for vertical sliding movement relative thereto; a seat support frame means 70 mounted on the intermediate frame for movement relative thereto between vertically spaced lower, intermediate and upper positions; a ratchet means 90 mounted on the intermediate frame means 30 and a pawl release means 110 mounted on the seat support frame means 70.

Tower assembly 11 will now be described with particular reference to FIG. 3. The stationary support means 10 has a base member 12 and a vertical tower member 13 rigidly mounted thereon as by welding. Tower member 13 includes a pair of laterally spaced side plates 14 connected by a back plate 15. A guide roller 17 is mounted on each of the side plates 14 and functions to mount intermediate frame means 30 for reciprocal movement on tower member 13, as will be more fully described hereinafter. The tower member 13 further includes a top plate 18 having an aperture 19 for receiving an adjusting shaft 21 of a spring tension adjusting knob 22 therethrough. The side plates 14 each include an aperture 23 at the lower end thereof adjacent the base member 12 for receiving a lower pivot shaft 24 therethrough, the function of which will be more fully described hereinafter.

Figures 1, 2:
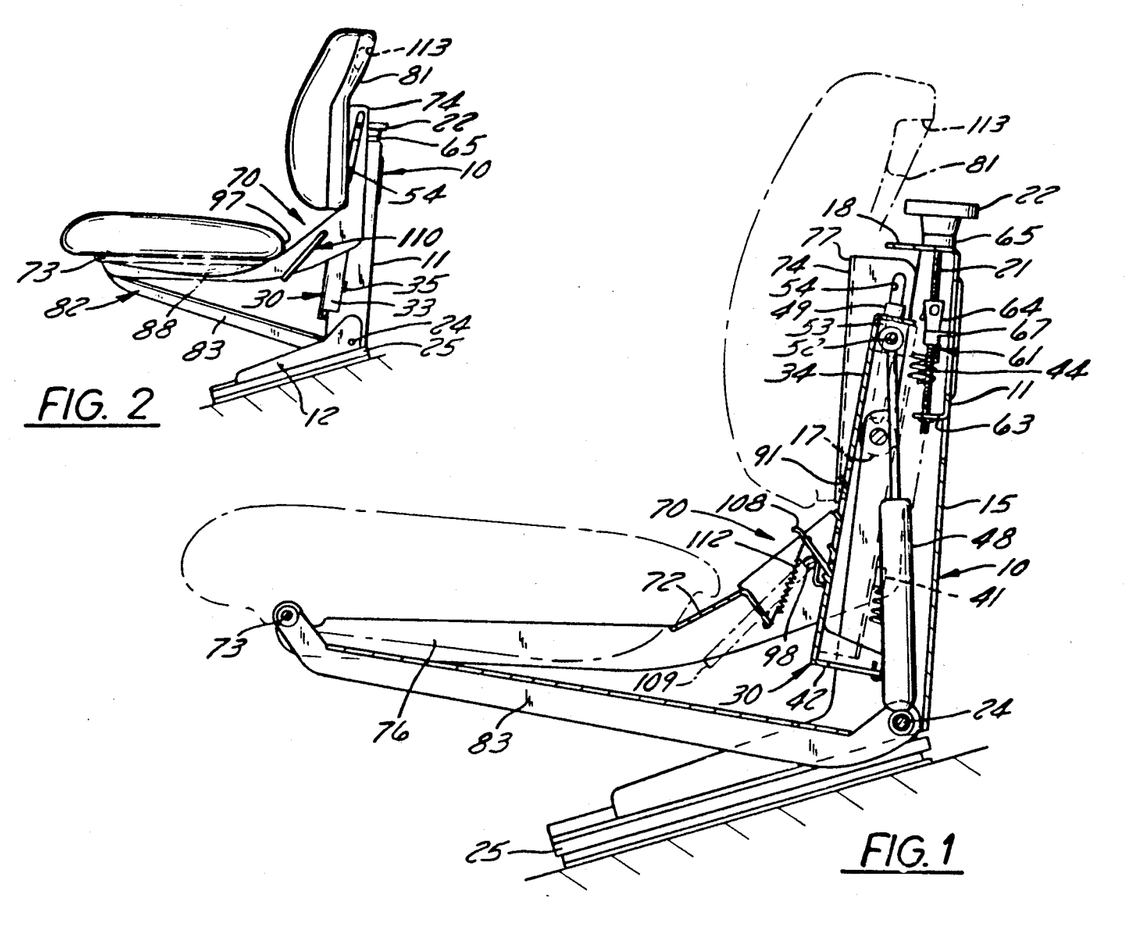
FIG. 1 is a side elevation, partially in section, of a seat suspension incorporating a first embodiment of the present invention and showing a seat support frame in its second lowest position of adjustment relative to an intermediate frame.
FIG. 2 is a side elevational view similar to the seat suspension shown in FIG. 1 showing the seat support frame in its uppermost position of adjustment.
Figures 5, 6:
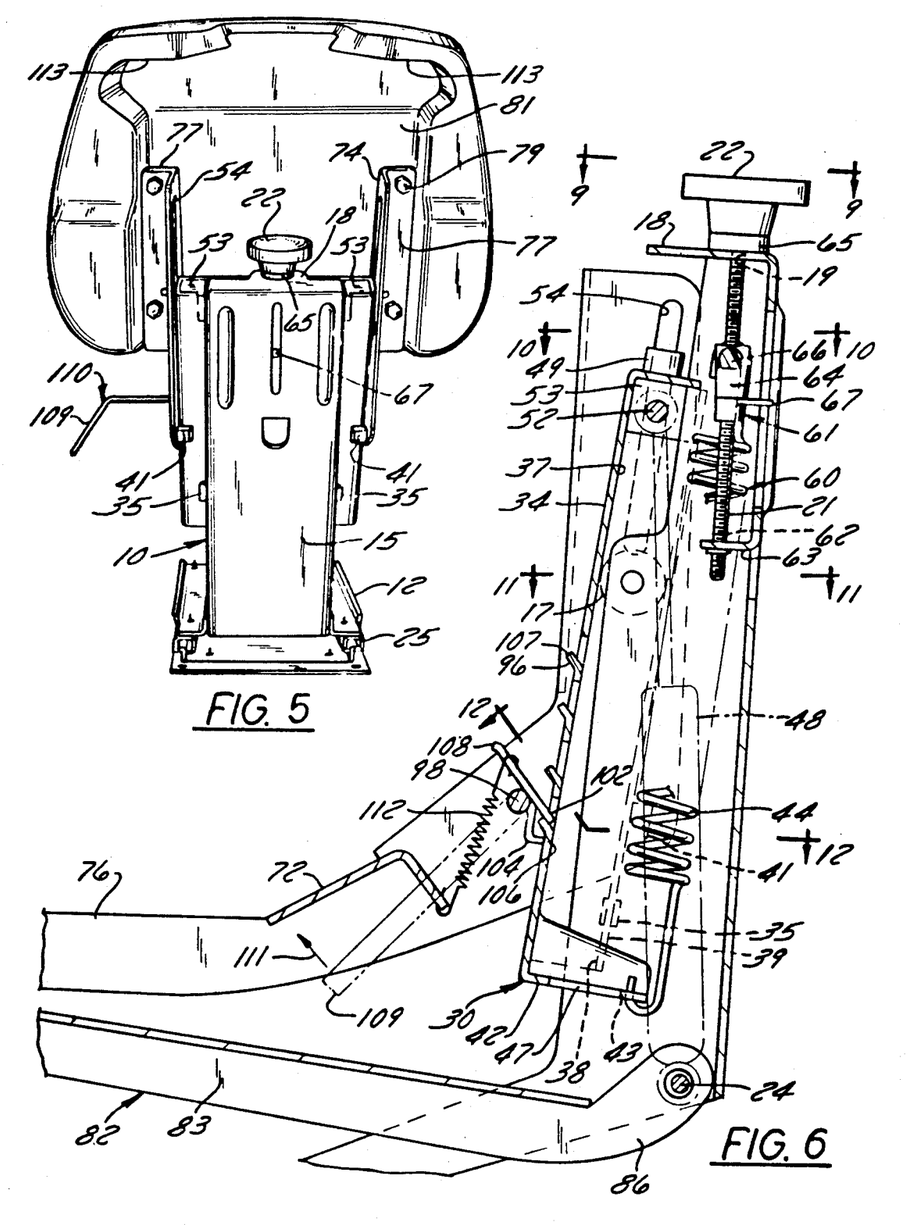
FIG. 5 is an isometric projection rear view of the seat suspension shown in FIG. 1.
FIG. 6 is an enlarged side elevational view partially in section showing the seat suspension in its second lowest position of adjustment.

The base member 12 of stationary support means 10 may be secured directly to the vehicle. However, if desired, and as shown in FIGS. 1 and 5, base member 12 may be mounted to the vehicle by means of a track and rail assembly 25 in a known manner to permit the tower assembly to be selectively moved in a fore and aft direction relative to the vehicle in order to place the operator closer to or farther from the vehicle steering wheel, not shown.

Figure 9:
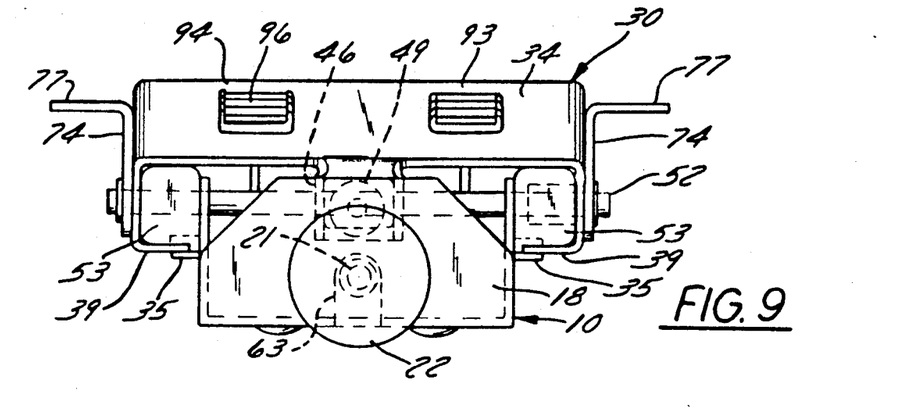
FIG. 9 is a top view of the seat suspension taken along line 9—9 of FIG. 6.
Figure 10:
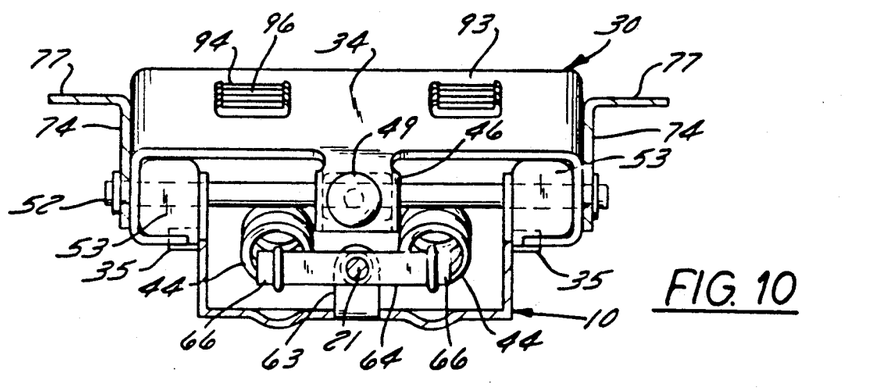
FIG. 10 is a sectional view of the seat suspension taken along line 10—10 of FIG. 6.
Figure 11:
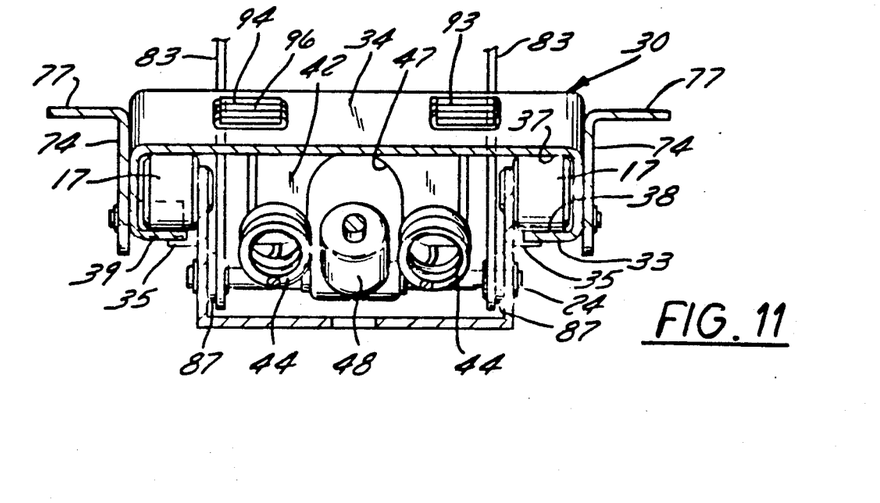
FIG. 11 is a cross-sectional view of the seat suspension along line 11—11 of FIG. 6.
Figure 12:
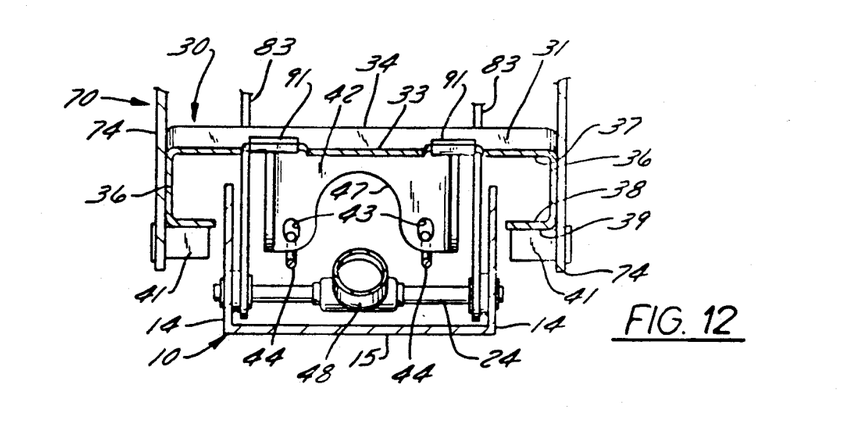
FIG. 12 is a cross-sectional view taken along line 12—12 of FIG. 6.

The intermediate frame means 30 will now be described. Intermediate frame means 30 comprises a guide roller supported main channel member 33, best shown in FIGS. 3 and 9 through 12. Main channel member 33 includes a front wall 34 having laterally spaced side channel elements 36. Each side channel element 36 includes spaced apart facing inner surfaces 37 and 38 and a rear outer surface 39, as best appear in FIGS. 11 and 12. Inner surfaces 37 and 38 are spaced apart to receive the guide rollers 17 therebetween. Rear outer surface 39 is adapted to engage slide blocks 41 (FIG. 12) carried by the seat support frame means 70. The channel elements 36 each has a channel guide 35 (FIGS. 5 and 10) thereon, preferably made of plastic, which slide along the outsides of the side plates 14 to provide for lateral stability. Channel member 33 also includes a bottom plate 42 (FIG. 12) having a pair of apertures 43 adapted to receive the ends of main suspension springs 44. The bottom plate 42 also has a relieved area 47 in order to provide operating clearance relative to a damper 48, as best appears in FIG. 11. The upper end of the channel member 33 is provided with an upstop bumper 49 (FIG. 6) contactable with the undersurface of the top plate 18 of the tower 13 which also assists in limiting damper side-to-side motion by cooperation with tabs 46 (FIG. 9). The upper end of each side channel element 36 is provided with an aperture 51 (FIG. 3) adapted to receive upper shaft 52 therethrough. Shaft 52 mounts downstops 53 and the upper end of damper 48 on the intermediate frame means 30. The upper shaft 52 also passes through slots 54 and by riding therein guidably connects intermediate frame means 30 to seat support frame means 70.

The suspension means 60 will now be described with particular reference to FIG. 3. The suspension means 60 mounts intermediate frame means 30 on stationary support means 10 for vertical floating movement relative thereto and includes: a pair of main support springs 44; damper 48; and mainspring tension adjusting assembly 61. As previously explained the upper end of damper 48 is secured to the upper end of channel member 33 by means of upper shaft 52. The lower end of damper 48 is secured to the lower end of the tower by means of lower pivot shaft 24. The lower ends of main suspension springs 44 are secured in apertures 43 (FIG. 12) of channel member 33. The upper ends of main suspension springs 44 are secured to the upper end of tower member 13 by means of the mainspring tension adjusting assembly 61, which will now be described.

The tension adjusting assembly 61 includes adjusting knob 22; threaded shaft 21 which passes through a thrust bearing space 65 and is then rotatably supported in aperture 19 (FIG. 3) presented by top plate 18 and aperture 62 in an intermediate flange 63 projecting inwardly from back plate 15 of tower 13; and spring support yoke 64. The movable spring support yoke 64 is threadably mounted on shaft 21 and includes transversely spaced saddles 66. The upper ends of mainsprings 44 are mounted in saddles 66 and rotation of adjusting knob 22 will move spring support yoke 64 either upward or downward on threaded shaft 21 to either increase or decrease the lifting force that mainsprings 44 will apply to intermediate frame means 30. A visual force setting indicator 67 (FIG. 5) may be provided on tower 13 if desired.

The seat support frame means 70 will now be described with particular reference to FIG. 3. The seat support frame 70 is slidably supported on the intermediate frame means 30 and includes a pair of side frame members 71 laterally spaced apart by an intermediate cross plate 72 and a fixed pivot shaft 73. The side frame members 71 include upstanding seat back mounting plates 74 spaced apart a distance sufficient to receive the intermediate frame channel member 33 therebetween and forward extending seat support arms 76. The seat back support plates 74 are each provided with vertical slot 54 dimensioned to receive upper shaft 52 therethrough, as previously explained. The seat back support plates 74 also have slide blocks 41 mounted on their lower ends. The slots 54 and the slide blocks 41 permit seat support frame means 70 to freely slide vertically relative to intermediate frame means 30. The upstanding rear seat back plates 74 also include transverse seat back mounting flanges 77 having vertically spaced apertures 78 therethrough. Fastening means 79, shown in FIG. 5, are inserted through apertures 78 and are threaded into seat back 81 to secure it to seat support frame means 70.

A swing arm seat stabilizing assembly 82 is rotatably supported on fixed pivot shaft 73 at the forward end of seat support frame means 70. The swing arm stabilizing assembly 82 comprises a channel member 83 secured to a tubular member 84 which is rotatably mounted on shaft 73 between side frame seat support arms 76. The rearward ends 86 of channel member 83 have apertures 85 to receive bushings 87 and are secured to the lower end of the tower member by means of lower shaft 24, as best appears in FIGS. 1 and 3. The pivot shaft 73 has cantilevered ends 75 extending beyond each of the side frame members 76, and a seat cushion support pan 88 (FIG. 2) is pivotally mounted on the ends 75 of shaft 73 to permit it to be tilted to a rain shedding position when the vehicle seat is not in use. Seat belt holder mounting slots 89 may also be provided in the side frame members 71, if desired.

Figure 4:
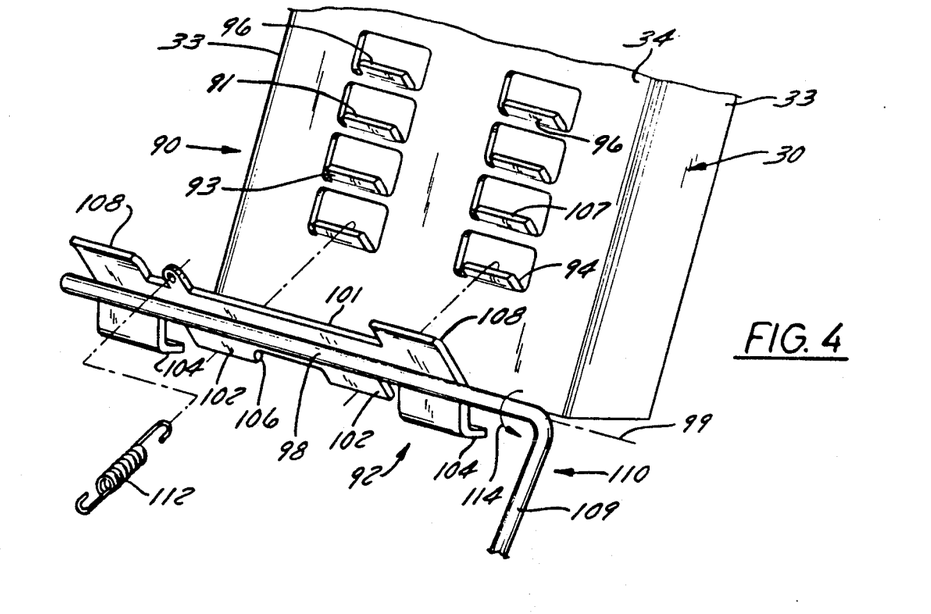
FIG. 4 is an isometric projection view of a portion of the seat assembly shown in FIG. 1.

The ratchet means 90 will now be described with particular reference to FIGS. 3 and 4. Ratchet means 90 serves to interconnect intermediate frame means 30 and seat support frame means 70 in a manner permitting seat support frame 70 to be secured in any one of a number of selectable lower, intermediate or upper positions. The ratchet means 90 includes a plurality of vertically spaced ratchet members 91 on intermediate frame means 30, and a pawl member in the form of assembly 92 mounted on seat support frame means 70.

The ratchet members 91 include two vertically extending series 93, 94 of transversely spaced ratchet teeth 96 on front wall 34 of intermediate channel frame 33. The transverse spacing of the vertical series 93, 94 of the ratchet teeth provides lateral stability for the seat support frame 70 at the rear portion of the operator's seat 97 (FIG. 2) by minimizing rocking of the seat support frame means 70 from side to side as the operator's weight is caused to shift due to lateral tipping of the vehicle during normal operation. The two vertically extending series 93, 94 of transversely spaced ratchet teeth provide the seat with an extremely solid feel and eliminates possible operator disorientation that movement of the lower rear portions of the seat can create. The ratchet teeth 96 are formed by stamping and bending out a series of vertically spaced tabs from front wall 34 of the intermediate frame means 30. Preferably, as shown in FIG. 6, the teeth 96 will project at an angle of approximately 45° from the plane surface of the front wall 34. The teeth 96 provide a plurality of lower, intermediate and upper positions for the seat support frame means and while four such positions are shown by way of example, additional positions could be provided by increasing the number of teeth.

Figures 7, 8:
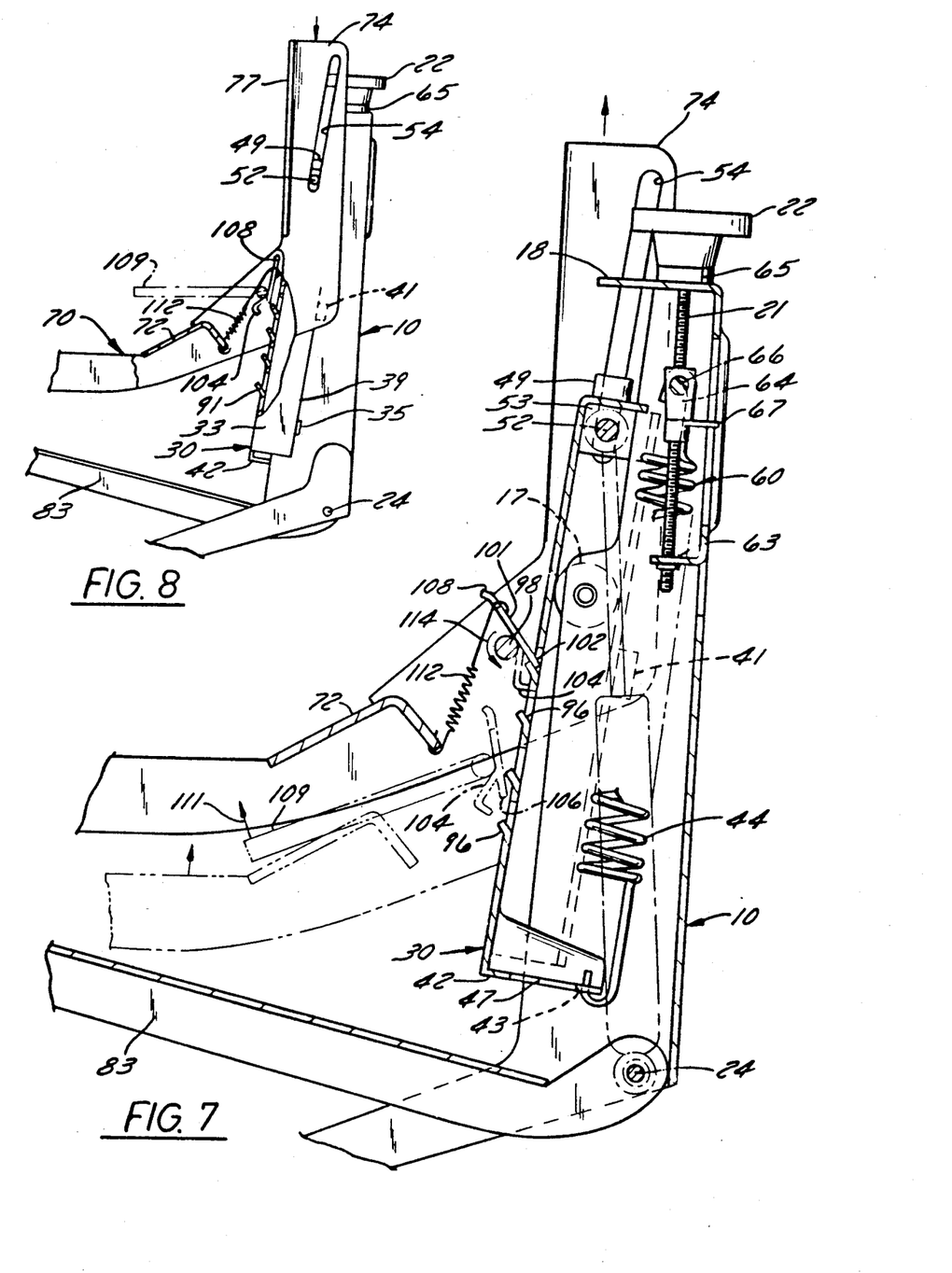
FIG. 7 is an enlarged side elevational view similar to FIG. 6 showing the seat suspension in its uppermost position of adjustment.
FIG. 8 is a partial side elevational view similar to FIG. 7 showing a pawl member of a ratchet means in a disengaged position.

The pawl member comprises an assembly 92 and includes a pawl support in the form of a rod member 98 having an axis 99. The pawl support rod member 98 extends between two vertically extending side walls 71 of seat support frame means 70 and has transversely spaced end portions journaled therein for rotation about axis 99. The pawl member assembly 92 further includes a transversely extending pawl plate 101 that is secured to rod member 98 intermediate the transversely spaced end portions. The pawl plate 101 includes two transversely spaced pawls 102 that extend radially therefrom in registry with the two series 93, 94 of ratchet teeth 96. The pawl member assembly 92 also includes an anti-release member in the form of two dogs 104 adjacent each end of rod member 98 which project radially therefrom for contact with front wall 34 of intermediate frame means 30 when pawls 102 are in an engaging position in contact with ratchet teeth 96, as best shown in FIG. 6. The anti-release dogs 104 prevent rotational movement of pawl support rod 98 and associated pawls 102 out of the engagement position when the operator's weight is on the seat. Rotational movement of pawl support rod 98 to move the pawls to the nonengaging position cannot occur until minimal initial movement of the seat support frame in a vertically upward direction has occurred which permits rod member 98 to rotate in a clockwise direction, as shown in FIGS. 7 and 8, because radially outer end 106 of pawl 102 will then be free to clear terminal end 107 of that particular tooth 96 with which it has been engaged.

In addition, pawl member assembly 92 includes a release limit stop that comprises an arm 108 adjacent each end of rod member 98. The arms 108 project radially from the rod member for contact with outer wall 34 of the intermediate frame means 30 when pawls 102 have been moved to a nonengagement position, as best appears in FIG. 8. The release limit stop arm 108 projects radially from rod member 98 diametrically opposite from the anti-release dogs 104. Preferably, the pawls 102, the dogs 104 and the release limit stop arms 108 are all integral parts of a single pawl plate 101.

A pawl release means 110 is provided to disengage the pawls 102 and includes a handle 109, preferably formed integral with rod member 98, which can be rotated by the operator in a clockwise direction, as shown by arrow 111 in FIG. 6, to move pawls 102 to the nonengagement position with the release limit stop arms 108 contacting wall 34 to limit the distance to which the handle 109 may be raised by the operator. The pawl release means 110 also includes a biasing member 112 connected between pawl plate 101 and the transverse cross member 72 that connects the two side wall members of the seat support frame together and serves to bias rod member 98 in a counterclockwise direction indicated by arrow 114 (FIG. 4).

When assembled, intermediate frame means 30 is mounted on stationary support means 10 for vertical reciprocating movement by means of guide roller 17 and spring suspension means 60. In turn, seat support frame means 70 is mounted on intermediate frame means 30 by upper shaft 52 which projects through slots 54 in vertical seat back mounting plates 74, through downstop slide blocks 53 and through the upper end of damper 48, and by slide blocks 41. The pawls 102 which are mounted on the seat support frame pans 70 are in engagement with their respective teeth 96 carried by the intermediate frame means 30. The lower end of the damper is pivotally supported on lower rod 24 at the bottom of support tower 13.

The main suspension springs 44 are interconnected between tower 13 and intermediate frame means 30, and the tension on these springs can be adjusted by means of adjusting knob 22 in order to adjust the suspension flotation as a function of the weight of the operator, and normally this will be done by setting the spring tension so that the intermediate frame means 30 is at the midpoint of its range of vertical travel when the seat is occupied by the vehicle operator.

The seat support frame means 70 can be adjusted vertically relative to the intermediate frame means to any one of the lower, intermediate or upper positions as determined by ratchet means 90, and specifically by the spacing of ratchet teeth 96 in intermediate frame means 30.

The seat suspension operates as follows. Assuming that seat support frame means 70 is in its lowermost position, as shown in FIG. 6, the operator need only to apply an upward force to seat support frame means 70. This upward force will cause seat support frame means 70 to move vertically and pawl 102 will contact terminal end 107 of the next higher ratchet tooth 96. This contact will cam pawl support rod 98 clockwise in the direction of arrow 111 to the position shown in dot-dash lines in FIG. 7 and continue to rotate rod 98 until pawl 102 slides past the terminal end 107 of the ratchet tooth 96 it has engaged. When outer end 106 of pawl 102 clears terminal end 107 of the ratchet tooth, biasing spring 112 will rotate the pawl support rod in a counterclockwise direction indicated by arrow 114 causing the pawl 102 to snap into an engagement position with regard to the next succeeding tooth 96. This snap action will create a tactile pulse which will be felt by the operator. In addition, as the pawl plate 102 snaps into the pawl engaging position, an audible click will be heard by the operator. The operator can count either the tactile pulses or the audible clicks, or both, and know exactly in which vertical position the seat support frame is located.

If the seat support frame means 70 is at the top uppermost limit position (FIG. 8), the operator need only move actuating lever 109 in the direction of arrow 111 to cam pawl 102 into the nonengaging position and then allow gravity force to move seat support frame means 70 to its lower position. When the seat is in the lower position, the operator can repeat the above described seat selection height procedure counting the tactile or audible pulses to raise the seat to the proper height. The seat height setting can be made by the operator either when on or off the vehicle. If the operator is on the vehicle, he must temporarily remove his weight from the seat to allow the seat to be moved. A handgrip means 113 (FIG. 5) that is built into seat back 81 provides a convenient point at which the seat can be grasped by the operator in order to raise the seat support frame 70 from a lower to any of the intermediate or upper positions without any need of activating pawl release means 110.

Second Embodiment

The seat suspension system of the second embodiment shown in FIGS. 13-18 functions in a manner similar to that of the first embodiment differing in two regards. First, the second embodiment provides a pawl release means 310 that includes a lockout latch structure 300 cooperable with a modified pawl member assembly 292 for locking the pawls 302 in the engaged position, and second, a height adjustment assist spring 215 is connected between the intermediate frame means 30 and the seat support frame 70. The stationary support means 10, the intermediate frame means 30, the seat support frame means 70 of the second embodiment, and their component parts are all identical to the seat suspension structure of the first embodiment and, therefore, these components will not be further described with respect to the second embodiment except as is necessary to describe the lockout latch structure 300, pawl member assembly 292, spring 215 and their operative association with the intermediate frame means 30 and the seat support frame means 70.

Figure 18:
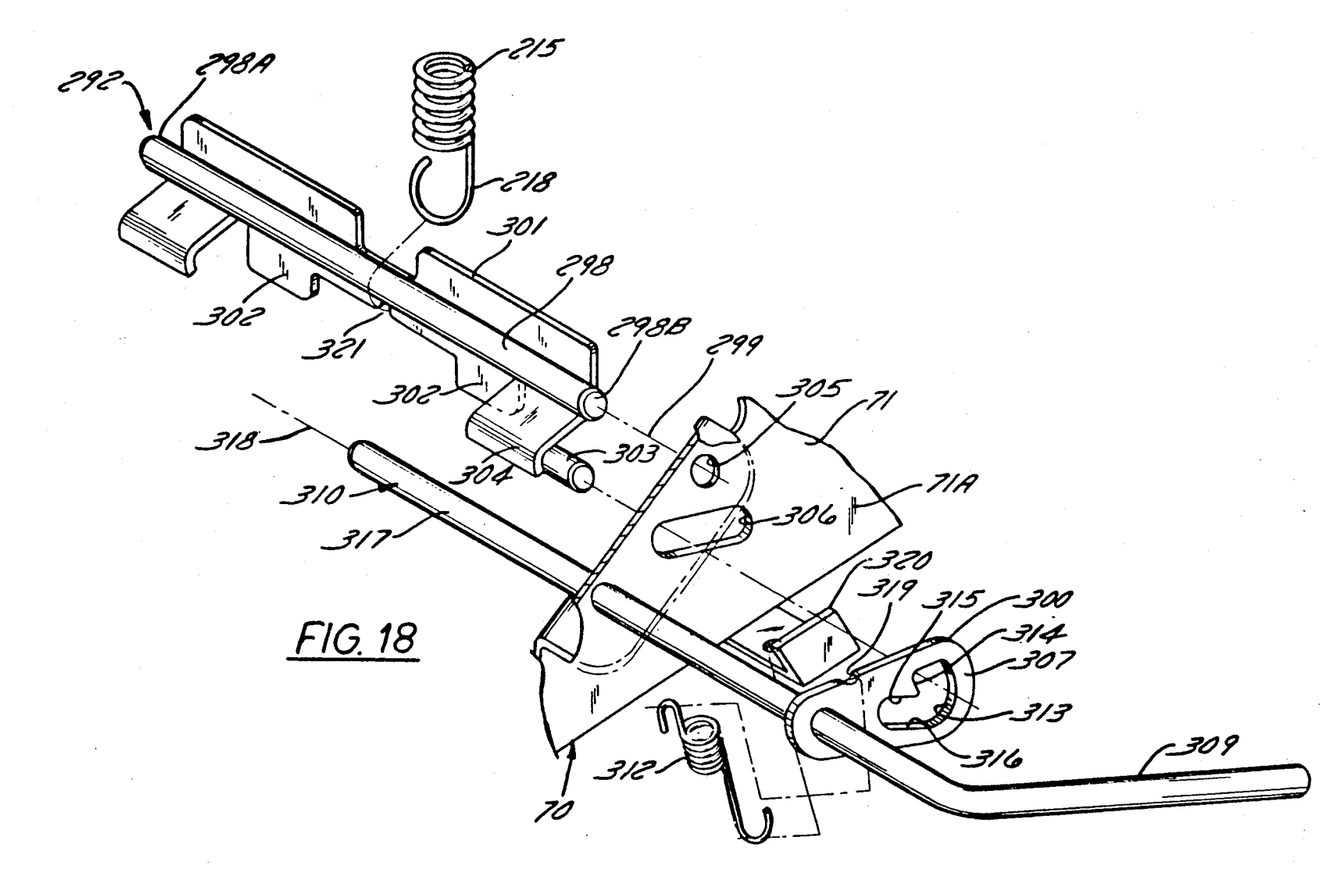
FIG. 18 is an isometric projection exploded view of the pawl member and the pawl release actuating means of the second embodiment of the seat suspension.

The pawl member assembly 292 of the second embodiment is best shown in FIG. 18 and includes a pawl support in the form of a rod member 298 having a first axis 299. The pawl support rod member 298 extends between the two vertically extending side walls 71 of the seat support frame means 70 and has transversely spaced end portions 298A, 298B journaled in apertures 305 therein for rotation about the first axis 299. The pawl member 292 further includes a transversely extending pawl plate 301 that is secured to rod member 298 intermediate transversely spaced end portions 298A and 298B. Pawl plate 301 also includes two transversely spaced pawls 302 that extend radially therefrom in registry with the two series 93, 94 of ratchet teeth 96, best shown in FIG. 4. The pawl member 292 further includes a cam follower means in the form of a cam follower pin 303 which is radially spaced from axis 299 of rod member 298 by a radial arm bracket 304. An access slot 306 is provided in the side frame member 71 to receive the cam follower pin 303 therethrough. The radial arm 304 is on the inner side of frame member 71 and the cam follower pin 303 extends through frame member 71 and projects beyond the outer side 71A of the side frame member 71.

A pawl release means 310 is provided to lock pawls 302 in the engaged position or to disengage the pawls 302. Pawl release means 310 includes an actuating member 309 in the form of a handle engageable by the operator; releasable lockout latch means 300; and a biasing member in the form of spring 312, as will now be described. The releasable lockout latch means 300 includes a cam plate 307 that includes an L-shaped cam slot 313 having a peripheral edge defining a pawl lock surface 314, a pawl unlock surface 315, and a lower cam surface 316. The pawl surfaces 314, 315 and 316 are contactable by cam follower pin 303.

Lockout latch means plate 300 is nonrotatably mounted on a latch rod 317. The latch rod 317 is preferably integral with the actuating handle 309 and is journaled for rotation in the seat support frame side walls 71 for rotation about a second axis 318 which is in spaced parallel relation to the first axis 299 of pawl plate rod member 298. Lockout latch plate 307 is positioned adjacent outer side 71A of side walls means 71 with the cam slot 313 in register with access slot 306. The biasing spring 312 is connected between a notch 319 on the lockout latch and a bracket 320 rigidly secured to side wall member 71. The seat frame height adjusting assist spring 215 has its upper end 216 connected to the upper end of the intermediate frame means 30 by means of a U-shaped bracket 217. The lower end 218 of assist spring 215 is secured in notch 321 of the pawl plate 301 and serves to bias the seat support frame means 70 upward relative to the intermediate frame means 30.

Figures 13, 14, 15:
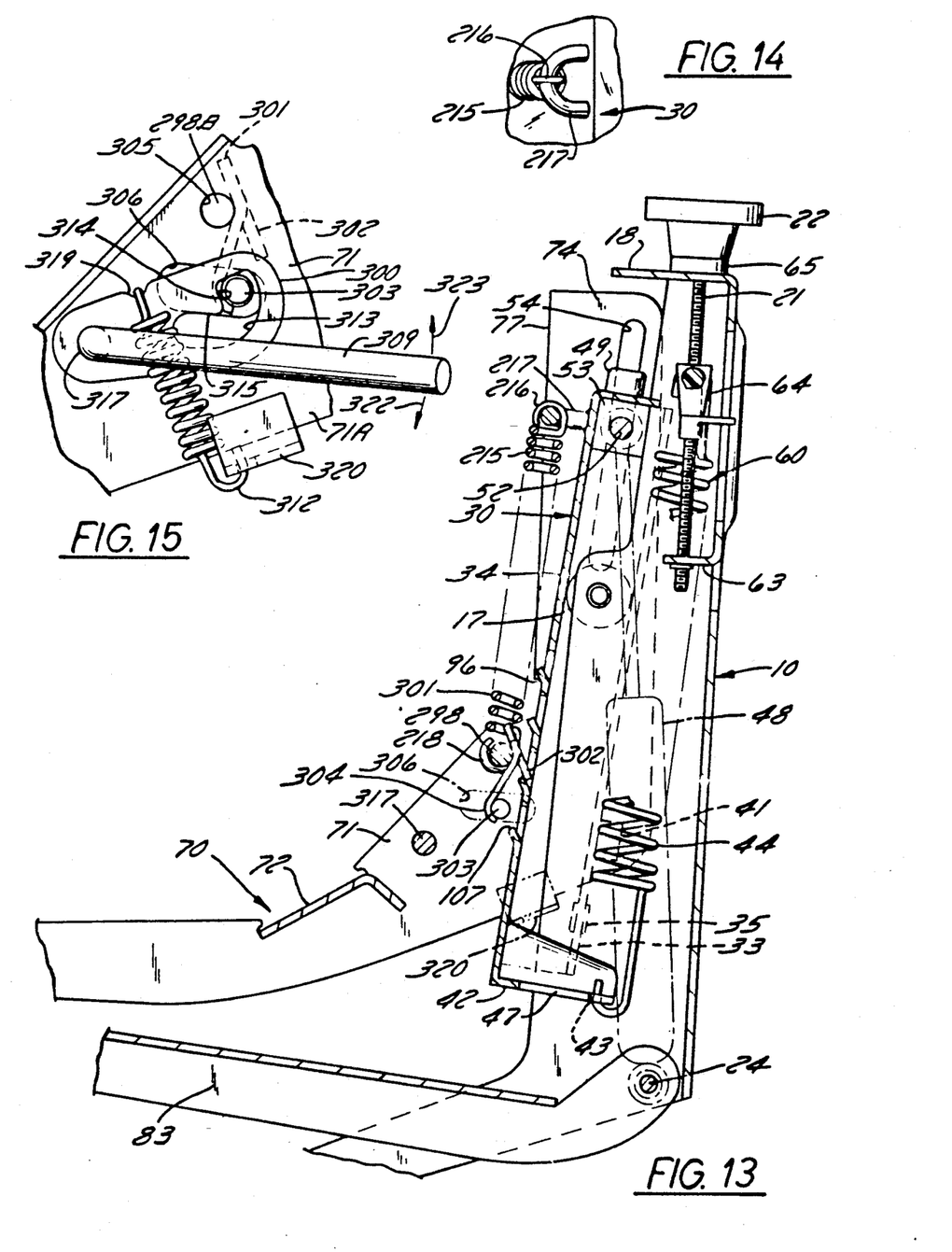
FIG. 13 is a partial side elevational view, partly in section, of a second embodiment of the seat suspension showing the seat support frame in an intermediate position of adjustment.
FIG. 14 is a top view of a portion of the seat suspension shown in FIG. 13 showing the upper attaching point of a seat adjust assist spring.
FIG. 15 is a enlarged partial side elevational view of the second embodiment of the seat suspension system shown in FIG. 13 showing a releasable lockout latch in a locked position.

The operation of the pawl member 292, the pawl release means 310 and the associated lockout latch 300 will now be discussed. With reference to FIG. 15, in order to lock the pawls 302 in their engaged position, the handle 309 is moved in the direction of arrow 322 to move the lockout latch plate 307 to the position where the pawl lock surface 314 is in contact with cam follower pin 303. In the position shown in FIG. 15, the pawl lock surface 314 abuts pin 303 and prevents it from moving clockwise in access slot 306. This prevents pawl 302 from moving out of engagement with ratchet tooth 96 with which it is engaged. In this position, the seat support frame 70 cannot be moved either upward or downward relative to the intermediate frame means 30 unless the actuating means handle 309 is moved in the direction of arrow 323 to the position shown in FIG. 17.

Figures 16, 17:
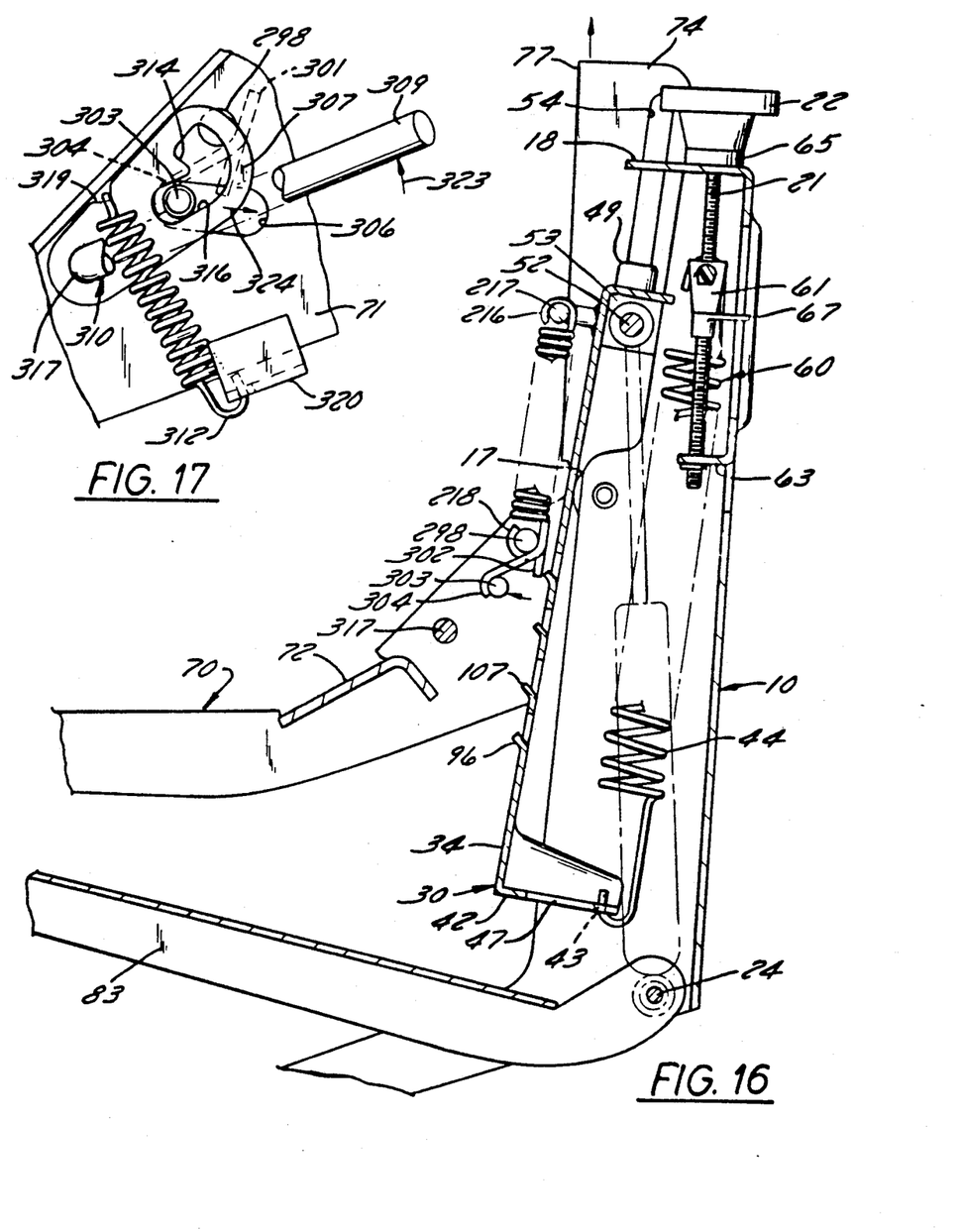
FIG. 16 is a side elevation of the second embodiment similar to that shown in FIG. 13 showing the seat support frame adjacent, to an uppermost position of adjustment.
FIG. 17 is an enlarged partial side elevation view similar to FIG. 15 showing the releasable lockout latch in an unlocked position.

With reference to FIG. 17, the handle 309 has been moved upward thus rotating lockout latch plate 307 counterclockwise against the bias of spring 312 to place the lower cam surface 316 in contact with cam follower pin 303. In this unlocked position, cam follower pin 303 is permitted to move to the pawl nonengagement position thus unlocking pawl plate rod 298 for rotational movement against the bias of spring 312. In this position, the cam follower pin 303 is free for limited fore-to-aft movement within cam slot 313. If the seat support frame has been placed in its lowermost position by lifting handle 309 and moving the seat support frame means 70 downward, the operator need only to apply a light upward force to the seat support frame means 70. This upward force will be supplemented by assist spring 215 and will cause seat support frame means 70 to move vertically. Pawl 302 will initially contact terminal end 107 of the next higher ratchet tooth 96 and this contact will cam the pawl support rod 298 until the pawl 302 slides past the terminal end 107 of the ratchet tooth that it has initially contacted. When the outer end of pawl 302 clears the terminal end 107 of the ratchet tooth, the biasing spring 312 will rotate pawl plate rod member 298 in a counterclockwise direction causing pawl 302 to move into an engagement position with regard to the next succeeding ratchet tooth 96. This action will create a tactile pulse which can be felt by the operator. In addition, as the pawl 302 snaps into the next position, an audible click will be heard by the operator. The operator can count either the tactile pulses or the audile clicks, or both, and know exactly in what vertical position the frame is located. From the foregoing explanation it will be apparent that when the lockout latch means 300 of the second embodiment is in its unlocked position, the seat support frame 70 can be raised in the same manner as has been explained in regard to the first embodiment.

If the seat support frame means 70 is to be lowered from any position it is in, movement of the lever 309 in the direction of arrow 323 to its upper position, as shown in FIGS. 16 and 17, will cause lower cam surface 316 to force cam follower pin 303 to the left in cam slot 313 thus holding pawl members 302 in the nonengagement position to permit the seat to be lowered against the bias of assist spring 215.

When the seat support frame 70 is in the desired position, it can be locked therein by moving lever 309 in the direction of arrow 322 to the position shown in FIG. 15. When this is done, pawl unlocked surface 315 will force pin 303 to the right in the direction of arrow 324 (FIG. 17) until pin 303 passes into contact with pawl lock surface 314.

What is claimed is:

1. A seat suspension for a vehicle seat permitting quick height adjustment comprising:
   a stationary support means adapted to be mounted on the vehicle;
   an intermediate frame means;
   a suspension means mounting said intermediate frame means on said stationary support means for vertical sliding movement relative thereto;
   a seat support frame means mounted on said intermediate frame for upward or downward movement relative thereto between vertically spaced lower, intermediate and upper positions;
   a ratchet means including a plurality of vertically spaced ratchet members mounted on one of said frame means and a pawl member including a pawl mounted on the other of said frame means for movement from an engagement position to a nonengagement position relative to said ratchet members to releasably secure said seat support frame means in any one of said selected lower, intermediate or upper positions; and
   a pawl release means including a biasing member and an actuating means for moving said pawl to said nonengagement position, said biasing member connected to releasably urge said pawl member toward said engagement position while allowing said seat support frame means to be moved from said lower to any of said intermediate or upper positions and create an impulse at each position without activating said actuating means, and said actuating means mounted to enable selective displacement of said pawl member to said pawl nonengagement position wherein said seat support frame means is free to be moved downward or upward to any of said upper, intermediate or lower positions.

2. A seat suspension according to claim 1 wherein
   said plurality of vertically spaced ratchet members are on said intermediate frame means; and
   said pawl member is mounted on said seat support frame means for movement to said pawl engagement position placing said pawl into engagement with any one of said ratchet members and to said nonengagement position wherein said pawl is withdrawn from said engagement with said ratchet members.

3. The seat suspension according to claim 2 wherein
   said intermediate frame means has a transverse extent and said ratchet members includes two vertically extending series of transversely spaced ratchet teeth on said intermediate frame; and
   said pawl member includes two pawls transversely spaced to register with said transversely spaced series of ratchet teeth to laterally stabilize said seat suspension.

4. The seat suspension according to claim 1 wherein said pawl member further includes
   a pawl support having said pawl mounted thereon and a support axis, said pawl support mounted on said seat support frame means for rotation about said axis to move said pawl to said engagement and nonengagement positions;
   an anti-release member preventing movement of said pawl support and pawl out of said engagement position until initial movement of said seat support frame in a vertically upward direction has occurred; and
   a release limit stop limiting said rotational movement of said pawl support when said pawl is moved to said nonengagement position to allow movement of said seat support frame means toward said lower position.

5. The seat suspension according to claim 4 wherein:
   said seat support frame means includes two vertically extending side walls transversely spaced apart;
   said intermediate frame means has a transverse extent and said ratchet member includes two vertically extending series of transversely spaced ratchet teeth on said intermediate frame;
   said pawl support comprises a rod member having transverse ends journaled respectively in said side walls to permit rotation of said rod member;
   said pawl member includes a transversely extending pawl plate secured to said rod member for rotation therewith intermediate said transversely spaced ends, and two transversely spaced pawls extending radially from said pawl plate in registry with said two series of ratchet teeth;
   said anti-release member includes a dog adjacent at least one end of said rod member that projects therefrom for contact with said intermediate frame means when said pawls are in said engaging position; and
   said release limit stop includes an arm adjacent at least one end of said rod member that projects therefrom for contact with said intermediate frame means when said pawls are in said nonengagement position.

6. The seat suspension according to claim 5 wherein said dogs and said release limit stop arms project radially from diametrically opposite sides of said rod member adjacent both ends thereof.

7. The seat suspension according to claim 5 wherein said pawls, dogs, and release limit stop arms are formed integral with and project from said pawl plate.

8. The seat suspension according to claim 1 wherein
   said intermediate frame means has a transverse extent and said ratchet member includes two series of vertically extending transversely separated ratchet teeth;
   said seat support frame means includes two vertically extending side walls transversely spaced to receive said intermediate frame means therebetween;
   said pawl member includes a pawl support having an axis, said pawl support mounted to extend transversely between said walls for rotation about said axis to move said pawl to said engagement and nonengagement positions; and
   said pawl member further includes two pawls mounted in transversely spaced relation on said pawl support to extend radially therefrom with each in register with one of said transversely spaced series of ratchet teeth to laterally stabilize said seat support frame means.

9. The seat suspension according to claim 8 wherein said pawl release means includes
   an anti-release member on said pawl member for contact with said intermediate frame means to prevent movement of said pawl support and pawls out of said engagement position without initial movement of said seat support frame means in a vertically upward direction; and
   a release limit stop limiting said rotational movement of said pawl support when moved to place said pawl in said nonengagement position.

10. The seat suspension according to claim 1 wherein said seat support frame means includes a seat support back having a hand grip means that can be grasped by the vehicle operator to raise said seat support frame means from said lower to any of said intermediate or upper positions without activating said pawl release means.

11. A seat suspension according to claim 1, wherein said pawl member further includes an anti-release member which moves with said pawl member and which prevents movement of said pawl member out of said engagement position until initial movement of said seat support frame means in a vertically upward direction has occurred.

12. A seat suspension according to claim 11, wherein said pawl member and said anti-release member are rotatable about a common axis.

13. A seat suspension for a vehicle seat permitting quick height adjustment comprising:
   a stationary support means adapted to be mounted on the vehicle;
   an intermediate frame means;
   a suspension means mounting said intermediate frame means on said stationary support means for vertical sliding movement relative thereto;
   a seat support frame means mounted on said intermediate frame for upward or downward movement relative thereto between vertically spaced lower, intermediate and upper positions;
   a ratchet means including a plurality of vertically spaced ratchet members mounted on one of said frame means and a pawl member including a pawl mounted on the other of said frame means for movement from an engagement position to a nonengagement position relative to said ratchet members to releasably secure said seat support frame means in any one of said selected lower, intermediate or upper positions; and
   a pawl release means including a biasing member and an actuating means for moving said pawl to said nonengagement position, said biasing member connected to releasably urge said pawl member toward said engagement position while allowing said seat support frame means to be moved from said lower to any of said intermediate or upper positions and create an impulse at each position without activating said actuating means, and said actuating means mounted to enable selective displacement of said pawl member to said pawl nonengagement position wherein said seat support frame means is free to be moved downward or upward to any of said upper, intermediate or lower positions, wherein
   said pawl member further includes a cam follower means movable to pawl locked and pawl unlocked positions;
   said pawl release actuating means comprises an actuating member and a releasable lockout latch means, said lockout latch means having a pawl lock cam surface and a pawl unlocked cam surface, said pawl locked cam surface contacting said cam follower means to lock said pawl in its engagement position, and said pawl unlocked cam surface contacting said cam follower means to place said pawl in said unlocked nonengagement position; and
   said biasing member is connected to said lockout latch means to releasably bias said lockout latch means toward said pawl engaged position.

14. The seat suspension according to claim 13 wherein
   said cam follower means comprises a cam follower pin; and
   said lockout latch means includes a cam slot having a peripheral edge defining said pawl lock and pawl unlocked surfaces that are contactable by said cam follower pin.

15. The seat suspension according to claim 14 wherein said cam slot is L-shaped with one leg of said L defining said unlocked position and the other leg of said L defining said locked position.

16. The seat suspension according to claim 14 wherein
   said pawl member includes a pawl rod member journaled in said seat support frame means for rotation about a first axis with said cam follower pin being mounted on said pawl rod member in radially spaced relation to said first axis;
   said actuating means includes a latch rod journaled in said seat support frame means for rotation about a second axis spaced from said first axis; and
   said lockout latch means is nonrotatably mounted on said latch rod to extend radially therefrom with said cam slot receiving said cam follower pin therein so that rotation of said actuating means will rotate said lockout latch means to move said cam follower pin and associated pawl to its engaged and nonengaged positions.

17. The seat suspension according to claim 16 wherein
   said seat support frame means includes a side wall means having an inner and an outer side;
   said pawl plate rod journaled in said side wall means with said cam follower pin projecting from said outer side of said side wall means; and
   said latch rod is journaled on said side wall means with said lockout latch means positioned adjacent said outer side of said side wall means to receive said cam follower pin in said lockout latch means cam slot.

18. The seat suspension according to claim 16 wherein said biasing member is connected between said lockout latch and said seat support frame means.

19. The seat suspension according to claim 16 wherein an assist spring is connected between said pawl member and said intermediate frame means to bias said seat support frame means upward relative to said intermediate frame means.

* * * * *